May 9, 1961    J. F. COALES ET AL    2,983,859
ON-OFF CONTROL SYSTEMS WITH FAST TIME SCALE COMPUTER
Filed May 18, 1956    4 Sheets-Sheet 4

United States Patent Office 2,983,859
Patented May 9, 1961

2,983,859
ON-OFF CONTROL SYSTEMS WITH FAST TIME SCALE COMPUTER

John Flavell Coales and Arnold Roy Maxwell Noton, Cambridge, England, assignors to National Research Development Corporation, London, England, a corporation of Great Britain Filed May 18, 1956, Ser. No. 585,690

Claims priority, application Great Britain May 20, 1955

15 Claims. (Cl. 318—448)

The present invention relates to control systems having at least two stable states—for example, an on-off or relay type of control system in which a driving motor is controlled so that the voltage across or output from the motor is applied fully in either one direction or the reverse direction only.

The invention is also applicable to a saturating system so as to bring the system to its linear function condition in a minimum period of time but without excessive overshoot.

A simple on-off type control system is of limited accuracy, causing serious over-shoots with step-inputs and excessive hunting under conditions of zero mean error between input and output. Also, because they are non-linear the general analysis of on-off type control systems is difficult, and exact analysis laborious. As a result, where good quality performances are required, more complicated continuous or proportional control systems, with derivative and integral terms added, have been preferred since they can be readily analysed and so designed to meet specific requirements.

The present invention aims at providing a control system with at least two stable states which has an improved performance compared with that of a simple on-off type system. An on-off type control system may be particularly advantageously employed to control a large output power, so that in large-powered systems an improved control system in accordance with the invention may well be preferable to a proportional control system. This is because, when the output power to be controlled is large, the most costly part of a control system is the output motor, the cost of which is roughly proportional to the peak output power. Consequently, an on-off type controller, which uses the peak power output of the motor all the time is, in this connection, more efficient than a proportional controller in which for most of the time only a fraction of the peak power output is utilised. Further, on-off type control systems do not require the large rotary power amplifiers used in proportional control systems.

From a more specific point of view the present invention aims at providing an on-off type control system (i.e. one having only two stable states) in which the output signal controlling the driving motor is changed over at an optimum time for bringing the error and the rate of change of error rapidly to zero. They must be brought to zero simultaneously if an undesirable degree of overshooting and hunting are to be avoided. For random inputs, the optimum time may be made dependent on some other criterion, such as the minimum value of mean square error.

A fundamental principle of the present invention is that for a control system having at least two stable states, such as an on-off type control system, whose operation is represented by a differential equation of any order, only one change-over of the stable state at a unique time is necessary to bring the error and rate of change of error to zero in the least possible time. Thus, in the case of a position control system whose output is provided by a motor driving a rotary load and in which both input and output are at rest, if the input is suddenly moved to a new position (a step function), in accordance with this principle, the output will be brought into line in the shortest possible time if the full torque of the motor is used to accelerate the load for a certain time and then, in the reverse direction, to decelerate it so as to bring it to rest exactly at the right position. The problem is, therefore, to make the changeover at the correct instant of time.

By way of introduction, the problem of optimum switching will now be considered for a simple second-order system before the problem applied to a system of any order is considered.

For a simple second-order system in which a constant force—herein assumed to be a torque—is applied in either direction to a pure inertia load (for example, a frictionless motor and load with ideal torque reversal), the differential equation of output position X can be written in the form $$b\ddot{X}=L \qquad (1)$$

where the torque $L=\pm 1$, and $b$ is a constant. If the input is $x(t)$, a function of time but hereafter usually abbreviated to $x$, then the error $e$ at any instant of time is given by $$e=x-X \qquad (2)$$

The elimination of $X$ between Equations 1 and 2 gives $$b\ddot{e}+L=b\ddot{x} \qquad (3)$$

Let the input $x$ as a function of time be given by $$x(t)=x_0+\dot{x}_0 t+\tfrac{1}{2}\ddot{x}_0 t^2 \qquad (4)$$

where the suffix "0" denotes present values. Then Equation 3 can be rewritten as $$b.\dot{e}.d\dot{e}/de+L=b\ddot{x}_0 \qquad (5)$$

Because this differential equation is unaltered by replacing $e$ by $e+$constant, that is, $e$ is not present explicitly in Equation 5, all possible solutions, represented as curves in the phase plane of $(e, \dot{e})$ are obtained by shifting any one solution of Equation 5 parallel to the $e$ axis. Integration of Equation 5 gives $$\tfrac{1}{2}b\dot{e}^2=(b\ddot{x}_0-L)e+\text{constant}$$

and the two parabolic curves ($L=\pm 1$) passing through the origin are $$\tfrac{1}{2}b\dot{e}^2=(b\ddot{x}_0\mp 1)e \qquad (6)$$

All other trajectories in the phase plane are merely shifts of these two curves parallel to the $e$ axis.

In the case of step or ramp inputs, $\ddot{X}_0=0$ and only the two parabolas defined by $$\tfrac{1}{2}b\dot{e}^2=\mp e \qquad (7)$$

need be considered. For step inputs $\dot{e}=-\dot{X}$ so $\dot{X}$ can be used instead of $\dot{e}$ in Equation 7. These two parabolas are shown in Figure 1 of the accompanying drawings as curves AOA' and BOB' passing through the origin of the $(e, \dot{e})$ plane.

The portions OA and OB are the critical trajectories because optimum switching is achieved by reversing the torque when the representative point reaches the curve AOB. Starting from any point P in the phase plane the representative point moves along a parabola (AOA' shifted along the $e$ axis) with, say, positive torque until its path intersects OB at Q, when the torque reversal occurs and the point moves to the origin along QO. For any point such as P there is always one unique point such as Q at which torque reversal must occur.

It will be seen from the Equation 7 that optimum switching is achieved by reversing the torque on reversal of the sign of the function:

$$(\tfrac{1}{2}b\dot{e}^2 \pm e) \quad (8)$$

where "−" applies for $\dot{e}$ less than 0 and "+" for $\dot{e}$ greater than 0. This is the switching function to make the best use of the available torque for step or "ramp" inputs. (A "ramp" input is one whose value changes linearly with time.) For such a simple case in practice this method would not be used because the function (8) could easily be formed by a non-linear network operating on $\dot{e}$.

An on-off type control system of any order can be represented by a differential equation of the form $$b_n d^n X/dt^n + \ldots + b\, dX/dt = L \quad (9)$$

where $L = \pm 1$ and the coefficients $b_i$, from $b_n$ to $b$, are usually constants but are not necessarily so, and where $n$ is any positive integer.

Eliminating X, by substituting $X = x - e$ as before in Equation 3, gives $$\sum_{i=1}^{n} b_i \frac{d^i e}{dt^i} + L = \sum_{i=1}^{n} b_i \frac{d^i x}{dt^i} \quad (10)$$

Let it be assumed that the input is prescribed as a function of future time so that the right hand side can be written down as a function of time independent of any torque reversal. The problem is to find where a number (P) of torque reversals must occur in order to bring error ($e$) and error rate ($\dot{e}$) to zero in the least possible time.

The differential equation can be solved for the (P+1) intervals when the applied torque has the same sign. Thus for the first interval by eliminating $t$ between the $e$ and $\dot{e}$ equations, the equation of the trajectory in the phase plane of ($e, \dot{e}$) can be written in the form $$h_1(e, \dot{e}\, L_1) = 0$$

Similarly for the other intervals the trajectory equations $$h_2(e, \dot{e}, L_2) = 0 \ldots h_n(e, \dot{e}, L_n) = 0 \quad (11)$$

where $L_1 = \pm 1$, $L_2 = \mp 1$, etc. The values of $e$ and $\dot{e}$ are required to be calculated at each switch point. For the P switch points there are then 2P variables, viz., $e_1, \dot{e}_1, e_2, \dot{e}_2, e_3$, etc. Then the variables minus the number of equations $= 2P - (P+1) = a$, say.

Assuming the equations are independent, there are three cases:

(1) $a$ greater than 0, having no unique solution;
(2) $a$ less than 0, having no solution; and
(3) $a = 0$, for which there is a unique solution.

For the case when $a = 0$, $P = 1$, i.e., provided the initial sign of the torque is correct, for an $n$th order system one torque reversal only is necesary to bring the representative point in the phase plane ($e, \dot{e}$) to the origin. Once the input is defined exactly as a function of time the solution for the point at which torque reversal must occur is unique and remains unchanged.

If, however, the switch-point is calculated on the basis of, say, a constant acceleration input but in fact the acceleration changes, a higher derivative exists; therefore, an error in switching will result. On the other hand, if more than one torque reversal is used (corresponding to $a$ greater than 0 in the equation above) the time taken to reach the origin is increased in accordance with the principle already given—namely, that only one changeover of the stable state is required to bring the error and error rate to zero in the least possible time.

It should be noted that, in calculating the switch point from the differential equation in $e$ and $x$, the derivatives of the input appear because of the corresponding coefficients in the differential equation of motor and load. As most systems have no "spring" term depending on the output position as in Equation 9 the calculation for step inputs, when $\ddot{x} = \dddot{x} \ldots = 0$, involves only error and its derivatives for step and ramp inputs.

When it is necessary to take into account $\ddot{x}$, and possibly $\dddot{x}$, and because viscous friction is usually present, the switching function will involve derivatives of both error and input. The practical realization of switching functions as such then becomes a very difficult problem, even for second-order systems. In the simple case, when only error and its derivatives are required for the switching function, the operations to be carried out on error are differentiations, additions, and some non-linear operation such as a logarithmic network. When input derivatives are present the whole function is much more complicated, and in addition several multiplications are necessary. For higher-order systems the switching functions become increasingly complicated and impracticable even for step inputs.

The general conclusion which can be drawn is that the method of achieving changeover of the stable states on reversal of the sign of switching function is impracticable, except in very simple cases.

In accordance with a feature of the present invention, the problem of optimum switching in an on-off type control system is solved by employing a fast computer technique in which the best time of changeover is computed by comparison of calculated values of the output and at least one of its derivatives with predicted values of the input and at least one of its derivatives based on their instantaneous values and also on at least an assumption as to their statistical nature.

The computation is carried out on the principle, already described, that for any on-off type control system at any instant one switch-over is necessary to make the trajectory of the representative point in the phase plane ($e, \dot{e}$) pass through the origin of that plane. The coordinates of the unique switch-point are then required to be computed in order to achieve optimum switching. Alternatively, if $t_1$ is the time ahead when switching must occur, then this quantity can be used to control switchover because actual switching should take place as $t_1$ becomes zero. To compute $t_1$ almost continuously, a self-adjusting loop system is used in the form of a repetitive computer working on a very fast time scale. Starting with the correct initial values, this computer is arranged to give error rate as functions of future time for some time ahead on the fast time scale. The circuits are then reset and the process repeated. By "working on fast time scale" is meant that the computer simulates the occurrence of events or sequences of events in a fraction of the actual time which is required for the events or sequences themselves to take place. Thus, for example, if an actual event occupies 1 second of real time, the simulation of that event in the computer may occupy, say, 0.001 second. The computer is, therefore, said to operate on a time scale faster than real time—in the ratio of 1000:1 for this example. This principle is specifically employed in the present invention not only to predict future input data concerning an independent variable but also future output data concerning the behaviour of a controlled mechanism whose equation of action is precisely known. Thus, the computer receives data concerning the instantaneous behaviour of the controlled mechanism, and from this makes many successive computations of future behaviour long before the controlled mechanism actually behaves in the predicted manner in practice. In this sense, the computer operates on a time scale faster than that of the controlled mechanism.

The computed waveforms of error and error rate are obtained as the difference between input and output waveforms. There is no fundamental difficulty—using, say, an analogue computer—in deducing future values of output, if the latter is defined by an $n$th order differential equation, and the controlling quantity (e.g. voltage across an electric motor) as a function of time is known since ($n-1$) initial conditions are given the future values of the output are prescribed.

The calculation of the future values of the position and velocity of the input is much more difficult, and the design of the input calculator or predictor depends on the nature of the input to be applied in practice. In the case of inputs which are step changes of position, velocity or acceleration the future position and velocity can be calculated exactly according to the equations:

$$x(t) = x_0 + \dot{x}_0 t + \tfrac{1}{2} \ddot{x}_0 t^2 \quad (12)$$

$$\dot{x}(t) = \dot{x}_0 + \ddot{x}_0 t \quad (13)$$

where $x_0$, $\dot{x}_0$ and $\ddot{x}_0$ are the present values of position, velocity and acceleration respectively. The practical realisation of this particular form of input predictor is described in detail as an example later in this specification.

The inputs commonly applied in practice, however, are at random, so that they can only be defined statistically. Furthermore, the random input-signal itself is very often contaminated with "noise" i.e. unwanted random fluctuations superimposed on the wanted signal. The presence of noise prevents pure differentiation of the input, necessary for the type of prediction envisaged by Equations 12 and 13. Under these conditions, a systematic theoretical treatment of the problem of statistical prediction is required. This has been given by Wiener. (Wiener N., "Extrapolation, Interpolation and Smoothing of Stationary Time Series"—J. Wiley and Sons, Inc., New York, N. Y., 1949.) An example is cited below.

Consider a random input which is composed of a sequence of random steps of velocity. Such an input is not a stationary random process, but its derivative may be considered as such. Furthermore, if the time-interval between the step changes of velocity varies according to a Poisson distribution, then it can be shown that the spectral density of the derivative of the input is of the form:

$$\Phi_D(\omega) = \frac{1}{(\omega_0^2 + \omega^2)} \quad (14)$$

Let the unwanted noise added to the random input signal have a constant frequency spectrum—so-called "white noise." Then:

$$\Phi_{nn}(\omega) = n^2 \quad (15)$$

Assuming signal and noise are uncorrelated, use of Wiener's theory leads to the best predicting transfer function to operate on the input, viz:

$$F(p) = \frac{1}{(1+Np+np^2)} \left( 1 + \frac{p}{\omega_0} - \frac{p}{\omega_0} \cdot e^{-\omega_0 s} (1+N\omega_0+n\omega_0^2)^{-1} \right) \quad (16)$$

$p$ being Laplace's operator; $N = \sqrt{(2n+\omega_0^2 n^2)}$; and the prediction is for a time $s$ ahead. A special case of interest is if $n$ is small and $s \ll 1/\omega_0$—i.e. prediction is only required a time ahead much less than the average interval between changes of rate. (In these conditions the follow-up errors of the control system would be small.) Then:

$$F(p) = \frac{1+sp}{(1+Np+np^2)} \quad (17)$$

Since $F(p)$ operates on the input, $x(t)$ say, the above transfer function can either be produced "en bloc," or the operation may be regarded as two stages:

(a) Filter with the transfer function $$\frac{1}{(1+Np+np^2)}$$

and (b) From this filtered signal $x_0'$, form its derivative and predict according to:

$$x(s) = x_0' + \dot{x}_0' s \quad (18)$$

This particular input signal possesses only one derivative. It will be seen that Equation 18 is the same type of prediction as that quoted in Equation 12 when $\ddot{x}_0 = 0$. In other words, the important modification (for noisy inputs) to the kind of predictor used for ideal transient inputs is the introduction of a preliminary filter designed according to the statistical properties of the signal and noise.

Where $t$ is used hereinafter to denote time on the actual time scale, $s$ will be used to denote time on the fast computing time scale. Thus where $t_1$ is the actual time ahead when switching should take place, $s_1$ is the time ahead on the fast time scale while the computed value of $e$ is $e(s)$.

A practical embodiment of the invention will now be particularly described by way of illustration only, with reference to the accompanying drawings in which.

Figure 2:
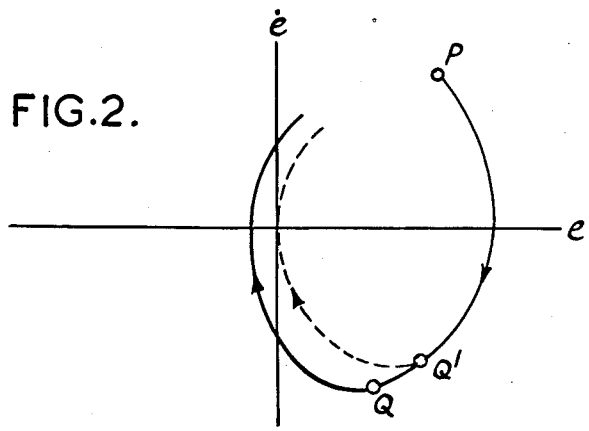

Figure 2 shows a typical waveform of error and error rate for a third order system on the fast computing time scale, presented as an $(e, \dot{e})$ phase plane response. The representative point starts at P (present position) and deceleration occurs until the torque is reversed at Q, time ahead. The subsequent path does not pass through the origin; torque reversal should have occurred earlier at the point Q'. The value of $s_1$ (fast time scale) or $t_1$ (actual time scale) used for this computation of $e(s)$ and $\dot{e}(s)$ is then incorrect.

Let $s_0$ be the time on the fast time scale after switch-over when $\dot{e}=0$. As seen from Figure 2, the value of $e$, at time $s=s_0$, is negative; thus, $e(s_0)$ being less than 0 implies that $s_1$ should be reduced. By using the value $e(s_0)$ to change the level $t_1$ in the right direction the next computed sweep of $e(s)$ and $\dot{e}(s)$ will have a more accurate value of $s_1$ and so on for subsequent sweeps until $e(s_0)=0$. The value of $s_1$ will then have adjusted itself to make the calculated phase plane trajectory pass through the origin, i.e., $s_1$ will then be the required switch-over time. Because this period of a computing sweep is arranged to be very much less that the time constants of the system, the value of $s_1$ is for practical purposes always the optimum switching time. Actual switching occurs when $s_1$ becomes zero, and after switching, the sequence is repeated.

The swithcing arrangements must however take into account that in a computed sweep $\dot{e}$ may never be zero, or it may be zero more than once, and the change required in the time $s_1$ produced by the value of $e(s_0)$ depends in sign on the initial state of the power relay. In view of this, correct switching depends on the following two rules:

Rule 1.—After changeover at time $s_1$ in the computing sweep, $e$ is observed when $\dot{e}$ is zero for the first time after changeover. If after changeover $\dot{e}$ is never zero, $e$ is observed at the end of the sweep.

Rule 2.—If the power relay is at $+A$, $e$ less than 0 implies "change earlier" and $e$ greater than 0 implies "change later." If the relay is at $-A$, $e$ greater than 0 implies "change earlier" and $e$ less than 0 implies "change later."

Figure 1:
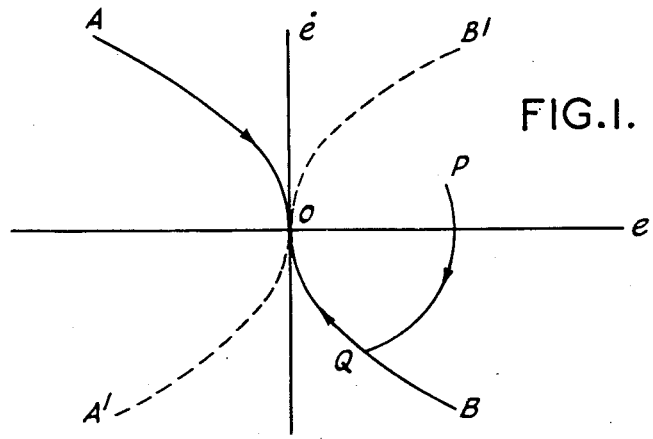
Figures 1 and 2 are diagrams of switching operations in two on-off type control systems.
Figure 3:
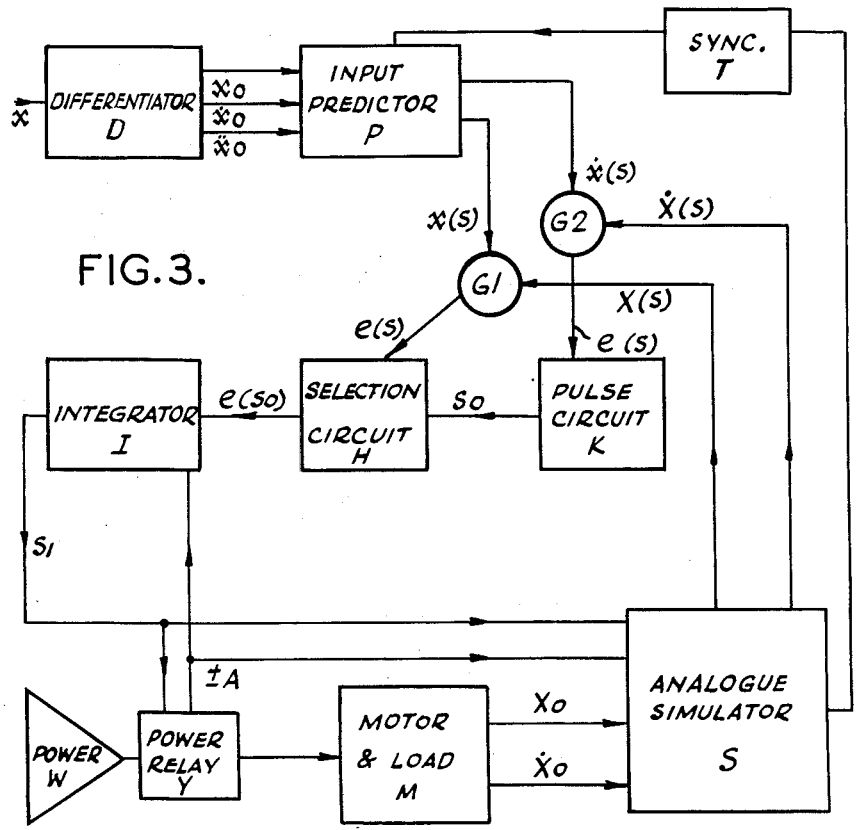
Figure 3 is a block schematic diagram of an on-off type control system.

The essential parts of an on-off type second order control system are shown as a block schematic diagram in Figure 3. The present position of the output X and output velocity $\dot{X}$ ($X_0$ and $\dot{X}_0$ respectively) of a controlled motor and load M are fed continuously to a simulator S in the form of an analogue computer.

(Here it should be noted that, for higher order systems, higher derivatives of the output would be necessary to set the simulator S, but they need not be measured as such. Taking the important case of a system which is of the third order due to delay in building up the motor field current, to set this simulator S, the voltages required correspond to X, $\dot{X}$ and the torque, not the acceleration $\ddot{X}$, which depends on the torque and $\dot{X}$. The torque is proportional to the field current which can easily be observed in practice. Modifications to enable the simulator S to do this are described in connection with Figure 4.)

Referring to Figure 3, the calculated changeover time $s_1$ is also fed as a voltage level to the simulator S from an integrator I. Starting with the relevant initial conditions the analogue simulator S gives a solution to the differential equation of motor and load M on the fast time scale. Although it may initially start at an arbitrary time, torque reversal in the simulator S soon settles down to start at the time $s_1$. Waveforms $X(s)$ and $\dot{X}(s)$ are thus obtained on the fast time scale and the process is repeated at a high frequency.

Where the input can be treated according to Equations 12 and 13, present values of velocity and acceleration are obtained in a differentiator D by differentiation. From these an input predictor P produces waveforms on the fast time-scale of approximate future values of input position and velocity according to the equations $$\dot{x}(s) = \dot{x}_0 + \ddot{x}_0 s$$

$$x(s) = x_0 + \dot{x}_0 s + \tfrac{1}{2}\ddot{x}_0 s^2$$

These waveforms are repeated at high frequency and are synchronized with the output waveforms $X(s)$ and $\dot{X}(s)$ by a synchronizer or master timer T.

By subtraction in units G1 and G2, $e(s)$ and $\dot{e}(s)$ are obtained. $\dot{e}(s)$ is fed into a pulse circuit K which generates a sharp pulse when $\dot{e}(s)$ passes zero in accordance with rule 1 previously given. (If the computing frequency is N cycles per second then it follows that there will be N pulses per second.)

Each pulse serves to select in a selection circuit H, the value of $e(s)$ at time $s=s_0$, or at the end of the computing period if $\dot{e}(s)$ is never zero in that period, in accordance with rule 1 above. This pulse $e(s_0)$, usually after amplification, becomes the input to the integrator I, the direct current output of which gives the voltage level $s_1$. The output $s_1$ is effectively the output of a self-adjusting loop system, which is, in fact, a subsidiary servo-mechanism. The loop gain is, however, variable because it depends on the $e$ and $\dot{e}$ waveforms, and it is a pulsed servo because information is only received in pulses at discrete intervals, N times per second.

The output $s_1$ is fed to the simulator S, as previously stated, and to a power relay Y which switches the output of a power source W to the motor M. When $s_1=0$ (represented in practice by a voltage level $s_1$ passing a critical value) the power relay Y is switched and torque reversal takes place.

The control system shown in Figure 3 will now be described in greater detail with reference to Figures 4 to 6. The duration of the fast time scale in the simulator S is arranged to be very short compared with the time constants of the motor and load M. The output position $X_0$ may be conveniently produced as the voltage across a special wire-wound potentiometer rotated by the armature shaft of the motor which is arranged to be a linear function of the angle of rotation. A tacho-generator TG driven by a motor may be arranged to produce an output voltage $\dot{X}_0$ proportional to the speed of rotation.

Figure 4:
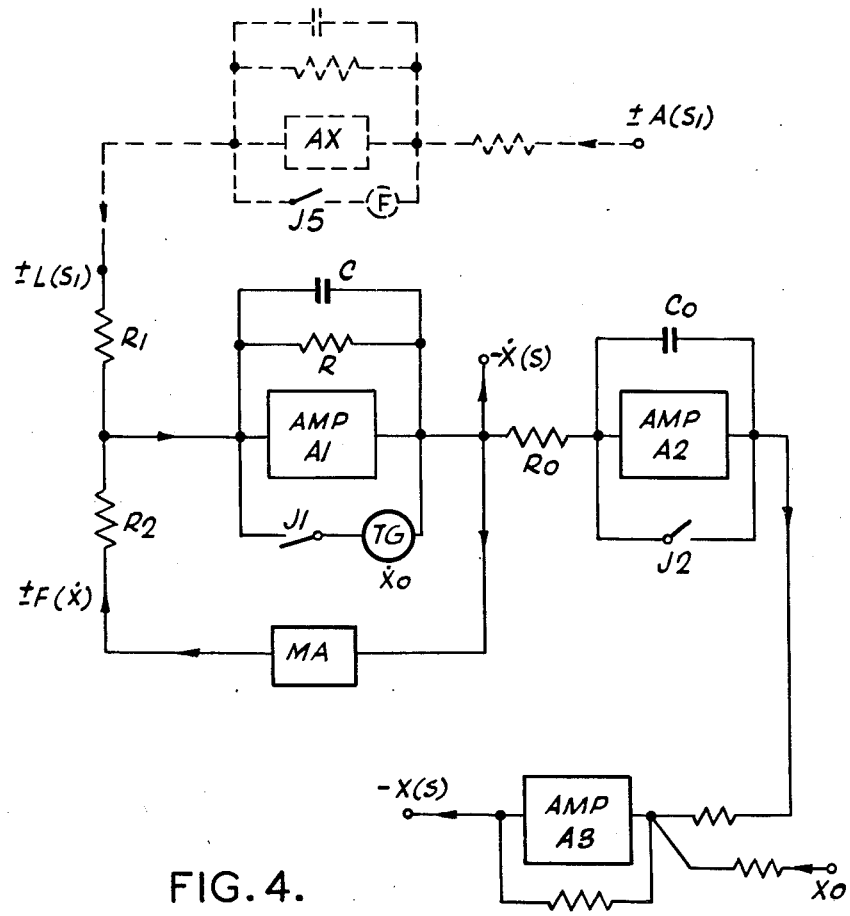

An analogue computer circuit of the simulator S for producing $X(s)$ and $\dot{X}(s)$ from $X_0$, $\dot{X}_0$ and signals indicating the changeover time $s_1$ and the applied torque $\pm L$ is shown schematically in Figure 4. The differential equation of the motor and load with which the computer circuit is designed to work is:

$$I_n \ddot{X} + F(\dot{X}) + GX = L \tag{19}$$

where $I_n$ is the moment of inertia; the term $F(\dot{X})$ represents Coulomb friction, a torque depending only on the sign of the velocity $\dot{X}$ and changing discontinuously at $\dot{X}=0$; and the term $GX$ represents the viscous friction.

In the first part of the circuit a high gain D.C. amplifier A1, having a capacitor C and resistor R connected across it, is fed with a current $\pm L(s_1)/R_1$ through a resistor $R_1$ and a current $\pm F(\dot{X})/R_2$ through a resistor $R_2$. The applied torque $\pm L$ is simulated by the output of a two-state or "bistable" multivibrator. At the beginning of each computing sweep the state of the multivibrator is set to correspond with the state of the power relay Y of Figure 3. After a time $s_1$ in each sweep the multivibrator state is changed (on torque reversal) by means of a trigger pulse generated when the voltage output of a conventional Miller time base generator coincides with the voltage level $s_1$ produced by the integrator I (Fig. 3). The time base generator is triggered by the synchroniser T (Figure 3).

The voltage $\pm F(\dot{X})$ corresponding to the torque of Coulomb friction is derived from a direct coupled multivibrator and D.C. amplifier MA which is fed with the computed value of the velocity $\dot{X}(s)$ produced by this first part of the computing circuits. The output of the unit MA is a fixed value depending only upon the sign of the computed velocity $\dot{X}(s)$. The circuit equation for the first part of the computer can be written $$\pm L/R_1 \pm F/R_2 = -(1+RCD)\dot{X}/R$$

where $D=d/dt$. The differential equation for the output $\dot{X}(s)$ is then $$RC\ddot{X} \pm R/R_2 \cdot F(\dot{X}) + \dot{X} = \pm R/R_1 \cdot L(s_1)$$

which, by correct choice of components, can be made equivalent on the fast time scale to the actual equation of motor and load, given by Equation 19.

The duration of each computation sweep may conveniently be arranged to be followed by an equal period for resetting. During a resetting period diode switches or high speed relays J1 and J2 are arranged to be closed so that when a computing sweep starts, by opening the relays, the output $\dot{X}(s)$ starts at $\dot{X}_0$ and the output $X(s)$ at zero, $X_0$ (i.e. the present position) being added to $X(s)$ in the next stage. $\dot{X}_0$ is the voltage developed by the tachogenerator TG attached to the motor shaft and its impedance is arranged to be negligible compared to that of $R_1$ or $R_2$.

The operation from $\dot{X}$ to $X(s)$ carried out by the second part of the computing circuit is pure integration. Provided the time constant of this integrating circuit is very much greater than the computing period, the second stage is pure integration followed in the third stage by addition of the input $X_0$. The units A2 and A3 are high gain D.C. amplifiers. The differential equation of the second and third parts is $$X(s) = (-1/R_0 C_0) \cdot \int_0^s \dot{X}(s)\, ds + X_0$$

In a third order system which takes into account the delay in building up the motor field current, as previously described in connection with Figure 3, the computer arrangement shown in Figure 4 would be modified so that the output $\pm L(s_1)$ was derived from the output $\pm A(s_1)$ of the power relay Y via the circuit shown in dotted lines instead of being taken directly therefrom. In this added circuit, the unit AX is a high gain D.C. amplifier, the electronic switch or relay J5 is operated by the synchroniser T in step with the switches or relays J1 and J2 and the unit F simulates the motor field current. As a result, the voltage required to set this circuit at the beginning of each computing sweep is proportional to the current through the field coils of the motor.

Figure 5:
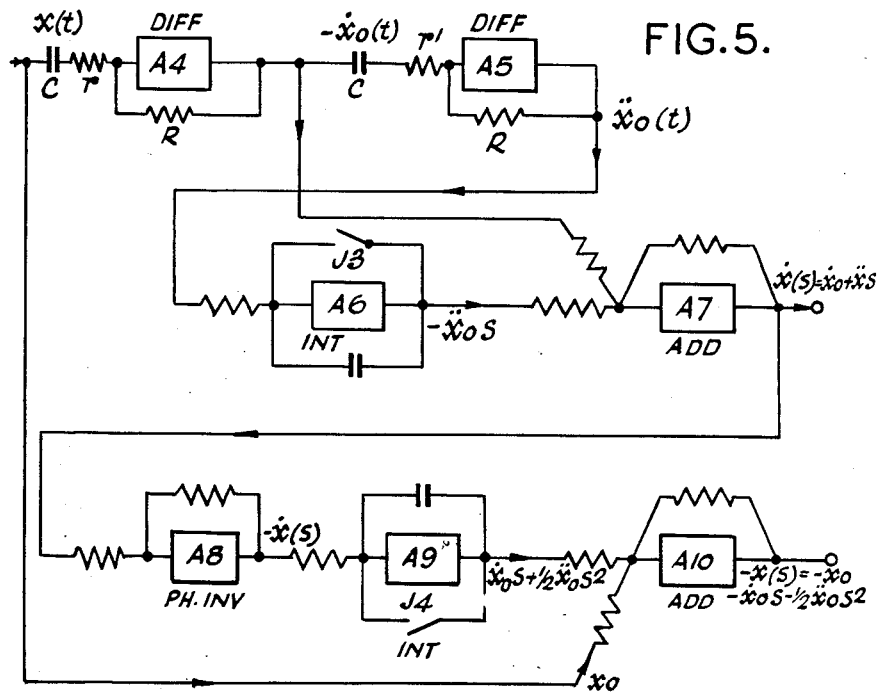
Figures 4 to 6 show in greater detail parts of the system shown in Figure 3.

One possible form of the differentiator D and the input predictor P are shown schematically in Figure 5. The various units A4 to A10 are high gain D.C. amplifiers which may conveniently be standard plug-in units. The input velocity $\dot{x}_0(t)$ is derived from the input $x$ by a feed-back differentiator involving the unit A4 and similarly the input acceleration $\ddot{x}_0(t)$ is derived from the input velocity by a circuit involving the unit A5. The differentiation is purposely made imperfect by the series resistors $r$ and $r'$, so that the first circuit gives differentiation with an exponential delay time $rC$ and the second circuit with a delay $r'C$. This is equivalent to filtering the input and lessens the effect of transients on power supplies, etc. It is necessary to decouple these differentiator circuits from the other circuits.

For slowly varying inputs, the voltages $x_0$, $\dot{x}_0$ and $\ddot{x}_0$ are virtually D.C. levels for the period of one computing sweep provided that this period is much less than the time of operation of the system. The integral $$\int_0^s \ddot{x}_0 ds$$

can then be written $\ddot{x}_0 s$ and similarly for other integrations. By correct choice of time constants the functions $$\dot{x}(s) = \dot{x}_0 + \ddot{x}_0 s$$

$$x(s) = x_0 - \dot{x}_0 s + \tfrac{1}{2} \ddot{x}_0 s^2$$

are generated in the input predictor by processes of addition and integration as shown in Figure 5 for the fast computing time scale. In the input predictor, the circuits involving the units A6 and A9 function as integrators, those involving the units A7 and A10 as adders, while the circuit involving the unit A8 functions as a phase inverter. The two diode switches or high speed relays J3 and J4 are synchronised by the synchroniser T (Figure 3) so that the operation of the input predictor as a whole is in step with the simulator S.

As shown schematically in Figure 3, voltages $e(s)$ and $\dot{e}(s)$ are formed by the gates G1 and G2 respectively by deriving the differences between the predicted input position $x(s)$ and the output position $X(s)$ in the first case, and the predicted input velocity $\dot{x}(s)$ and the velocity of the output $\dot{X}(s)$ in the second case.

Figure 6:
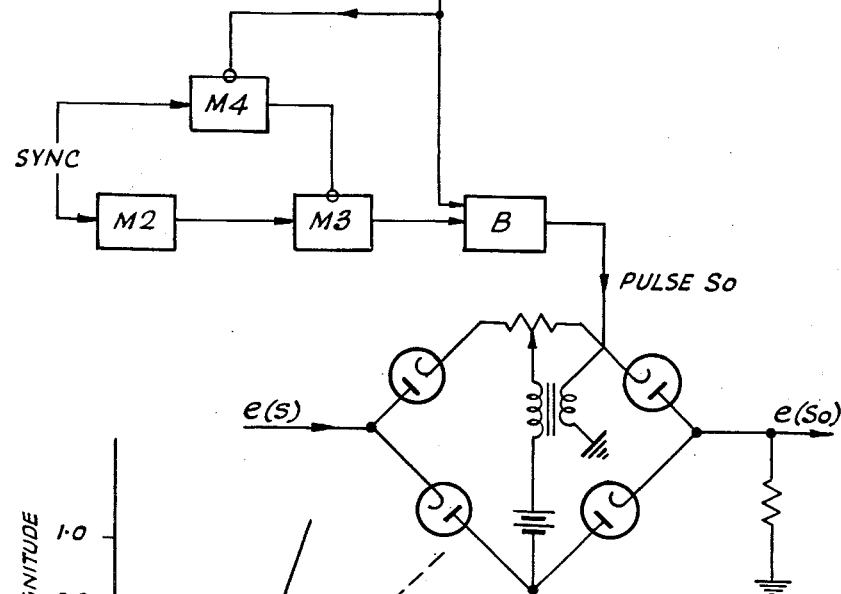

The value of the position error at the predicted changeover time, $e(s_0)$, is derived from these voltages $e(s)$ and $\dot{e}(s)$ by the pulse generating circuit K and selection circuit H as shown in Figure 6.

The pulse circuit consists essentially of a comparator circuit E and four two-state or bistable multivibrator units M1 to M4, and is arranged to produce in the following manner a short duration output pulse from a buffer adding circuit B after changeover when $\dot{e}(s)$ passes through zero level, or at the end of the computing sweep if otherwise in accordance with rule 1. The comparator circuit E produces an output pulse which is applied to the multivibrator unit M1 whenever the input $\dot{e}(s)$ passes a voltage level corresponding to $\dot{e}(s)=0$. The multivibrator unit M1 is arranged to generate a short duration rectangular pulse when $\dot{e}(s)=0$, but the unit is arranged to be paralysed and incapable of producing an output until after the computed changeover time $s_1$ by the action of a voltage $\pm A(s_1)$ derived from the simulator S.

The multivibrator unit M2, which is triggered from the synchroniser T, is arranged to produce a sharp pulse just before the end of each computing sweep which is used to trigger the multivibrator unit M3 so that it produces a short duration rectangular pulse which is applied to the buffer circuit B to make it produce an output pulse at the end of a computing period, provided that the multivibrator unit M1 has not produced a pulse. Otherwise, if the multivibrator unit M1 has produced a pulse during a computing sweep, the multivibrator unit M3 is arranged to be paralysed until the end of that sweep by the multivibrator unit M4 which is controlled by the output of the multivibrator unit M1. If the multivibrator unit M4 has acted, it is reset at the end of the computing sweep by a pulse from the synchroniser T. In this way, a rectangular pulse of short duration in comparison with the computing sweep period is generated at time $s_0$ in accordance with rule 2.

This pulse at time $s_0$ is used to select the value of the voltage $e(s)$ at time $s_0$ in a conventional diode bridge circuit as shown in the lower part of Figure 6. The output of the circuit $e(s_0)$ is supplied to the integrator circuit I.

The integrator circuit I is arranged to produce a voltage level corresponding to the time $s_1$ on the fast computing time scale at which switching of the power relay Y should take place, by adding or subtracting the integrals of the successive error voltages $e(s_0)$ produced by the selection circuit. In accordance with rule 2, the sense in which the error voltage $e(s_0)$ is applied must depend upon the state of the power relay Y. The integrator circuit I is accordingly arranged to phase-invert the error voltage pulse $e(s_0)$ for one position of the relay Y by means of a feed-back amplifier of unit gain switched into circuit when necessary by a relay.

After amplification the resulting pulse $\pm e(s_0)$ is fed into an integrating circuit producing a voltage of value $s_1$. This voltage is applied to a direct-coupled bistable multivibrator which changes state when $s_1$ passes a critical level corresponding to $s_1=0$. The transition from one state to another of this multivibrator provides a trigger pulse to change the state of another bistable multivibrator. The power relay is operated by the anode current of one of the triodes of the second multivibrator.

In order to return the voltage $s_1$ below the critical value the step arising from the transition of the first multivibrator is integrated until the output of that integrator is well below the critical value once more.

A control system according to the invention was tested with a model motor and load arranged to have long time-constants (5 secs.) and a computing fast time scale of 50 c.p.s. so that the switching necessary in the computing circuits could be carried out by high speed relays. The model motor and load was a Velodyne type 74 with brass flywheel to increase the inertia to the requisite value for giving the above time-constant. A worm on the armature shaft drove a wire-wound potentiometer with a reduction ratio of 133:1, the voltage across this potentiometer being a linear function of the angle of shaft rotation so that it provided the output position signal $X_0$.

The differential equation of motor and load can be written:

$$J\ddot{X} + F(\dot{X}) + cI_f^2 \dot{X}/(r+R) = KRII_f/(r+R)$$

where $J$ = moment of inertia;
$c$ and $K$ are constants;
$F(\dot{X})$ = Coulomb friction term, dependent on the sign of the velocity $\dot{X}$ and changing discontinuously at $\dot{X}=0$;
$I$ and $I_f$ = armature and field currents respectively.

The motor was shunt wound, the field being separately fed whilst the resistance $r$ was connected in series with the armature and the resistance R was connected across both. The currents I and $I_f$ were made almost independent of motor speed by feeding from D.C. mains through large resistances, and torque reversal was effected by reversing the field current, $I_f^2$ being unchanged. The "viscous friction" was varied by means of the resistance R, and the maximum speed was varied by controlling I. The velocity $\dot{X}$ was measured by a tacho-generator on the motor shaft.

If T is the exponential time-constant of the motor and load, and T' is the time to decelerate from full speed to rest, the following were the parameters of the motor and load:

Max. armature speed=910 r.p.m.=one rotation of the potentiometer shaft in 8.8 secs.
$T$=5.0 sec.
$T'$=2.8 sec.
Total moment of inertia=$29 \times 10^3$ gm.-cm.$^2$
Applied torque=660 gm.-cm.
Coulomb torque=95 gm.-cm.
Field current=24 ma.

Figure 7:
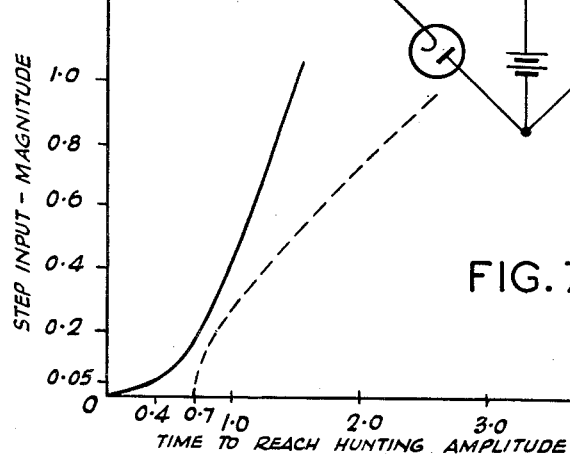
Figure 7 is a graph showing comparative response characteristics of a system according to the present invention and an orthodox saturating servo system.

Figure 7 shows graphically a comparison between a control system according to the present invention (full line) and an orthodox proportional linear system with saturation (dotted line). The curves show the time taken for each system to reduce the error to 0.004 units of position—the hunting amplitude—against the magnitude of the initial error. For small errors, the orthodox system behaves linearly. The most notable difference occurs for small amplitude inputs; for a step input of 0.05 unit of position, the on-off system takes 0.4 unit of time, whereas the orthodox system takes 0.7 unit.

A fair conclusion is that, on the average, the on-off servo system brings input and output into line in about two thirds of the time taken by the orthodox system. Since time taken is proportional to the square root of the applied torque, it follows that the torque of the on-off system could be reduced by half to give a performance similar to that of the orthodox system, but its maximum speed would be halved.

What we claim is:

1. An automatic electronic controller having at least two stable states for governing the action of a controlled mechanism in accordance with changes in an independently variable input signal comprising an electronic load simulator operable in accordance with the equation of action of the controlled mechanism on a time scale faster than that of the controlled mechanism to generate successive signals representing future values of position of the controlled mechanism and further successive signals representing the first derivatives of said future positions; an input predictor operating on the same fast time scale for generating corresponding successions of signals representing predicted values of the independent variable and predicted first derivatives of said variable; a pulsed servo loop coupled to the outputs from the said simulator and the said predictor for deriving, on the said fast time scale, successive error signals and generating an output signal representing successive estimated optimum instants approaching zero time for the next change of state of the controller, and means responsive to the zero-time value of said output signal for governing the action of said controlled mechanism.

2. A controller according to claim 1 wherein the input stage to the predictor is constituted by an input differentiator for generating signals representing the first and second derivatives of the independent variable signal.

3. A controller according to claim 2 wherein the means governing the action of the controlled mechanism is adapted to feed to the load simulator a signal indicative of its instantaneous state.

4. A controller according to claim 3 wherein the output signal from the pulsed servo loop is also fed to the load simulator.

5. A controller according to claim 1 wherein the pulsed servo loop includes a subtraction unit for comparing the first derivative of the future position of the controlled mechanism with the first derivative of the independent variable, and for generating a trigger pulse when the difference is zero, said trigger pulse being fed to a selector circuit for passing the corresponding instantaneous error signal to the output circuit of the said pulsed servo loop.

6. A controller according to claim 5 wherein the error signal is fed to an integrator which derives a corresponding voltage signal representing future time of change of the state of the controller.

7. An automatic electronic controller having at least two stable states for governing the action of a controlled mechanism in accordance with changes in independently variable input signals representing external information, and comprising a predictor for generating trains of signals representing future values of said input signals and the first and second derivatives thereof, respectively; a load simulator having $n$ inputs from the controlled mechanism, where the performance of the latter is represented by an $n$th order differential equation, and having outputs for signals representing future positions of the said controlled mechanism and the first derivative thereof; a time base synchronising circuit operating on a time scale faster than that of the controlled mechanism and coupled to both the predictor and the load simulator; and a pulsed servo loop for deriving successive signals representing estimated optimum instants approaching zero time for effecting a change of state of the controlled mechanism and including a first gating circuit for passing first error signal representing the difference between the instantaneous values of future input signal and future position of the controlled mechanism; a second gating circuit for passing second error signal representing the difference between the instantaneous values of the first derivatives of said future input and position signals; a pulse generator circuit for generating selector pulse signals corresponding to the instants when the said second error signals most nearly approach zero value; a selector circuit fed by the outputs from the said first gating circuit and the said pulse generator for passing a first error signal whenever a selector pulse is received from the pulse generator; and means for deriving from the output of said selector circuit a control signal for changing the state of the controlled mechanism.

8. A controller according to claim 7 wherein the circuit for selecting the value of first error signal comprises a diode bridge across one diagonal of which the selector pulse is applied whilst the said first error signals are fed to one end of the other diagonal and the selected error signal is taken from the opposite end thereof.

9. A controller according to claim 7 wherein the means for deriving the control signal comprises an integrator having its input connected to the output of the selector circuit and including a phase inverter controlled by a signal representing the instantaneous state of the controlled mechanism.

10. An automatic electronic controller of the type having two or more stable states for governing the action of a controlled mechanism in accordance with changes in independently variable input signals representing external information, said controller comprising an input channel for said signals including a differentiator for generating signals representing a derivative of the said input signals, a predictor for solving equations governing future behaviour of the source of said input signals and whose output represents successive calculated future values of input information and a derivative thereof; a load simulator circuit for solving the equations governing behaviour of the load and whose output represents successive calculated future values of load displacement and a derivative thereof; a fast time base circuit coupled to both said input predictor and said load simulator for determining, on a time scale faster than real time, the frequency of computation of said calculated future values by both said predictor and said load simulator; a circuit for comparing the respective outputs of said predictor and said load simulator and for producing an output signal representing error in future time; a gate circuit fed from the comparison circuit with signals representing future positional error; a pulse generator fed from the comparison circuit with signals representing a derivative of said error, said pulse generator being adapted to generate a trigger pulse whenever said derivative becomes zero; a connection for feeding said trigger pulse to said gating circuit to open the same; an integrator coupled to the output of said gating circuit for deriving a signal representing future time up to the optimum instant of change-over; a connection between said integrator output and said load simulator for ensuring that each successive computation by the simulator is related to a preceding calculation of future time up to the optimum instant of change-over; and a further connection between said integrator output and a control relay for causing said relay to effect a change of state of the controller when the output signal from said integrator reaches a value representing zero future time for change-over.

11. A control system having two or more stable states for governing the action of a controlled mechanism in response to input signals representing an external condition, and wherein a control signal is generated which has at least two discrete values each representing a respective stable state, comprising a computer operating on a time scale fast in relation to the operative time constant of the controlled mechanism for repetitively extrapolating into future time present data represented by the input signals and by output signals representing the action of the controlled mechanism; means for feeding to the computer a signal indicative of the present discrete value of the control signal; a comparison element for generating signals representing errors between the extrapolated output and input signals at successive future instants of time, each comparison giving rise to a resultant signal; means for feeding said resultant signal to the computer as a correction factor for the extrapolation of output data until said resultant signal is brought to a predetermined value; and means responsive to said predetermined value for effecting change of the control signal from one discrete value to another.

12. A control system according to claim 11 wherein the computer includes circuits for generating signals representing, respectively, future input magnitude and rate of change of input and future output magnitude and rate of change of output; and a subtractor for deriving signals representing, respectively, error of magnitude and error rate.

13. A control system according to claim 12 wherein each control signal is of constant magnitude and changeable in sign, and the computer is adapted to predict one single instant of time when a change of sign must occur, consequent upon which the error and rate of error signals will be reduced to zero simultaneously.

14. A control system according to claim 13 wherein the computer estimates, on the fast time scale, a first instant of change of sign, observes the error at the consequent first instant of zero error rate or, if the error rate never reaches zero, at the end of that time cycle, and applies the new error signals to estimate a new instant of change of sign.

15. A control system according to claim 11 including an input predictor for generating successive signals representing, respectively, future magnitude and future rate of change of input and a simulator for generating successive signals representing, respectively, future magnitude and future rate of change of output; a subtractor for generating successive signals representing, respectively, error of magnitude and error rate; a pulsed servo loop to which said future error and error rate signals are fed and having an output representing, on the fast time scale, successive estimated instants of change of action of the controlled mechanism and including a generator for generating a pulse at each instant, on the fast time scale, when the error rate passes through zero; a gate operated by said zero error signals for passing the corresponding error signal; an integrator for integrating said error signals; and a trigger circuit responsive to a predetermined value of integrated error signal representing the optimum instant of change of state of said controlled mechanism for effecting said change of state.

References Cited in the file of this patent
UNITED STATES PATENTS

| | | |
|---|---|---|
| 2,420,891 | McCann et al. | May 20, 1947 |
| 2,701,328 | Woodruf | Feb. 1, 1955 |
| 2,771,243 | Wolin et al. | Nov. 20, 1956 |
| 2,804,264 | Stern | Aug. 27, 1957 |
| 2,829,329 | Silva | Apr. 1, 1958 |
| 2,862,167 | Curry | Nov. 25, 1958 |